United States Patent
Tokudome et al.

(10) Patent No.: US 10,969,958 B2
(45) Date of Patent: Apr. 6, 2021

(54) KEY-INPUT DISPLAY APPARATUS, KEY-INPUT DISPLAY SYSTEM, AND KEY-INPUT DISPLAY PROGRAM

(71) Applicant: INVIO, INC., Tokyo (JP)

(72) Inventors: Kenro Tokudome, Tokyo (JP); Shusaku Tohya, Tokyo (JP)

(73) Assignee: INVIO, INC., Tokyo (JP)

(*) Notice: Subject to any disclaimer, the term of this patent is extended or adjusted under 35 U.S.C. 154(b) by 0 days.

(21) Appl. No.: 15/545,180

(22) PCT Filed: Jan. 25, 2016

(86) PCT No.: PCT/JP2016/052051
§ 371 (c)(1),
(2) Date: Jul. 20, 2017

(87) PCT Pub. No.: WO2016/117710
PCT Pub. Date: Jul. 28, 2016

(65) Prior Publication Data
US 2017/0371516 A1    Dec. 28, 2017

(30) Foreign Application Priority Data

Jan. 24, 2015   (JP) .............................. JP2015-011879

(51) Int. Cl.
*G06F 3/0489*   (2013.01)
*G06F 3/02*   (2006.01)
(Continued)

(52) U.S. Cl.
CPC .............. *G06F 3/0489* (2013.01); *G06F 3/02* (2013.01); *G06F 3/038* (2013.01); *G06F 3/04895* (2013.01); *G06F 3/04886* (2013.01)

(58) Field of Classification Search
CPC .... G06F 3/0489; G06F 3/04895; G06F 3/038; G06F 3/02; G06F 3/94886
See application file for complete search history.

(56) References Cited

U.S. PATENT DOCUMENTS

2010/0083161 A1* 4/2010 Yoshizawa ............... G06F 9/44
715/773
2014/0327621 A1* 11/2014 Faggin .................. G06F 3/0202
345/168
(Continued)

FOREIGN PATENT DOCUMENTS

JP    H10-021191 A    1/1998
JP    2003-036130 A   2/2003
(Continued)

OTHER PUBLICATIONS

International Search Report (PCT/ISA/210) dated Mar. 15, 2016, by the Japan Patent Office as the International Searching Authority for International Application No. PCT/JP2016/052051.
(Continued)

*Primary Examiner* — Alexander Eisen
*Assistant Examiner* — Kebede T Teshome
(74) *Attorney, Agent, or Firm* — Cermak Nakajima & McGowan LLP; Tomoko Nakajima (57) ABSTRACT

Provided is a technique for supporting communication of a method for using an application for a key-input display apparatus that displays a key input on the application on an execution screen of the application displayed on a display unit. The key-input display apparatus includes an input-history display control unit that outputs an input-history display screen to the display unit. The input-history display screen sequentially displays key operation histories of key inputs one by one as a separate screen from the execution screen of the application. Thus, key inputs for the application are visualized, and therefore there is no need to alternately follow an input operation with an input device, such as a keyboard, and the execution screen of the application with eyes, allowing easy grasp of key inputs by watching the (Continued)

input-history display screen displayed side by side with the execution screen of the application.

13 Claims, 7 Drawing Sheets

(51) Int. Cl.
*G06F 3/038* (2013.01)
*G06F 3/0488* (2013.01)

(56) References Cited

U.S. PATENT DOCUMENTS

2017/0102779 A1* 4/2017 Park .................. G06F 3/018
2018/0011844 A1* 1/2018 Park .................. G06F 3/0237

FOREIGN PATENT DOCUMENTS

| JP | 2003-162215 A | 6/2003 |
| JP | 2003186383 A | 7/2003 |
| JP | 2004-355059 A | 12/2004 |
| JP | 2006-277771 A | 10/2006 |
| JP | 2008-116509 A | 5/2008 |
| JP | 2008116509 A * | 5/2008 |
| JP | 2009-211661 A | 9/2009 |
| JP | 2009-237659 A | 10/2009 |
| JP | 2010-079661 A | 4/2010 |
| JP | 2011-175401 A | 9/2011 |
| JP | 2013-168108 A | 8/2013 |

OTHER PUBLICATIONS

Written Opinion (PCT/ISA/237) dated Mar. 15, 2016, by the Japan Patent Office as the International Searching Authority for International Application No. PCT/JP2016/052051.

Office Action (Notification of Reasons for Refusal) dated Apr. 24, 2018, by the Japanese Patent Office in corresponding Japanese Patent Application No. 2015-205272, and an English Translation of the Office Action. (6 pages).

Office Action (Notice of Reasons for Refusal) dated Mar. 13, 2020, by the Japanese Patent Office in corresponding Japanese Patent Application No. 2016-570738, and an English Translation of the Office Action. (8 pages).

* cited by examiner

KEY-INPUT DISPLAY APPARATUS, KEY-INPUT DISPLAY SYSTEM, AND KEY-INPUT DISPLAY PROGRAM

TECHNICAL FIELD

The present invention relates to a technique for displaying key inputs for a renting application by means of an input device, such as a keyboard, on the screen of a display unit.

BACKGROUND ART

Applications having many functions according to purpose, such as word processing software, spreadsheet software, CAD software, e-mail software, and programming software, are used in companies and organizations. Such applications generally include many functions. Therefore, a considerable level of proficiency based on much knowledge and experience on usage is required to use them well to improve work efficiency. An example of a method for describing how to use an application is a method of screenshotting an execution screen of the application and adding a description thereto, such as an instruction manual. Another example is a method of describing verbally by an operator while demonstrating the operation.

SUMMARY OF INVENTION

Technical Problem

However, the method of screenshotting the execution screen of an application and describing the usage needs huge trouble and time to create a description for each function of the application. Therefore, it is not a very realistic way to describe how to use the application using an instruction manual. In the method of verbal description and demonstration, the verbal description often cannot catch up operator's key inputs on a keyboard unless the operator considerably drops the speed of key input. In particular, skilled operators perform operations more efficiently, and therefore often perform multiple key input using modifier keys, press of which is not displayed alone on the execution screen. This makes it difficult for both of the operators and learners who receive the description to learn the usage by alternately observing operations on the execution screen and the keyboard with eyes.

Thus, since the conventional description of a method for using applications is troublesome, time-consuming, and inefficient, an improvement in work efficiency and productivity, which could be expected if the learners are familiar with an efficient and effective method for using the application, has not actually been achieved. For example, in a scene in which a learner learns a highly efficient programming skill of a skilled programmer, there are many sites in which skill transfer is not advanced and is neglected because it is difficult to teach the skill, as described above. Furthermore, usage of modifier keys in word processing software, spreadsheet software, and CAD software is useful in enhancing work efficiency and productivity, but its learning is left to individual effort.

The present invention is made in view of the above related art. An object thereof is to provide a technique for supporting communication of a method for use applications.

Solution to Problem

The present invention achieves the above object using a key-input display apparatus, a key-input display system, and a key-input display program described below.

The present invention relating to a key-input display apparatus is a key-input display apparatus that displays a key input to an application on an execution screen of the application displayed on an display unit and is characterized by including an input-history display control unit that outputs an input-history display screen, to the display unit, in which the key operation histories of key inputs are displayed one by one as a separate screen from the execution screen of the application.

The present invention relating to a key-input display system is a key-input display system including a key-input display apparatus and an external storage unit and is characterized in that the key-input display apparatus displays a key input to an application on an execution screen of the application displayed on a display unit and outputs an input-history display screen, to the display unit, in which the key operation histories of key inputs are displayed one by one as a separate screen from the execution screen of the application and that the external storage unit stores data in which the key operation histories and the application are associated with each other.

The present invention relating to a key-input display program is a key-input display program that causes a computer to function as a key-input display apparatus that displays a key input to an application on an execution screen of the application and is characterized by causing the computer to function as an input-history display control unit that outputs an input-history display screen, to the display unit, in which the key operation histories of key inputs are displayed one by one as a separate screen from the execution screen of the application.

In the present invention, the key operation histories of key inputs to the application are displayed and visualized on the input-history display screen. This eliminates the need for alternately following input operations on an input unit, such as a keyboard, and the execution screen of the application with eyes and allows oho key inputs to be easily grasped by watching the input-history display screen that is displayed side by side with the execution screen of the application. Since the input-history display screen is displayed as a dedicated screen (separate screen) independent from the execution screen of the application, it has high visibility. Furthermore, since the key operation histories are displayed on the input-history display screen while being fed in the order of key inputs, the key input operations can be grasped as a flow. This enables the context of even a fast and complex key input to be grasped, allowing operator's operations on the application to be effectively and efficiently communicated to learners.

The input-history display control unit of the present invention displays the key operation history on the input-history display screen in real time upon key input to the application.

This allows the key operation history to fee displayed on the input-history display screen in real time in conjunction with a change in the execution screen of the application.

The input-history display control unit of the present invention displays a key operation history of each key input line by line on the input-history display screen.

Thus, the key operation history of each key input is displayed line by line, and therefore high visibility is provided, allowing the key operation history to toe easily grasped.

The present invention includes an input-data acquisition unit that acquires key input data generated by key input to an application selected from a plurality of running supplications.

This allows, even if a plurality of applications have been started, the key input data on the selected application can be acquired by the input-data acquisition unit, so that key operation histories of each application can be displayed on a single input-history display screen.

The input-history display control unit of the present invention displays a single keyed-in key as a key operation history on the input-history display screen. The input-history display control unit also displays a plurality of continuously keyed-in keys as a key operation history on the input-history display screen.

Thus, a single key that is keyed in is displayed as a key operation history, and a plurality of keys that are continuously keyed in are also displayed. Therefore, a plurality of keys that are keyed in in complex manner, such as modifier keys, are also displayed as a single key operation history, allowing such input operations to be easily grasped. This point will be described more specifically as follows.

For example, some key inputs using a keyboard are not displayed on the execution screen of an application, such as modifier keys, function keys, and a lock key. However, skilled operators for the application efficiently operate those keys by using them positively. In one simple example, for word processing software, a selected letter string is cut off using "CTRL+X" and is pasted using "CTRL+V" to avoid the complicated work of operating a souse. However, the individual key inputs themselves, such as "CTRL+V", are not displayed on the execution screen of the application. For that reason, learners who are watching operator's operation cannot find out how cut-and-paste is performed. To find it out, there is a need for the operator to teach it or the leaner to ask the operator as the need arises. Visualizing such hidden key inputs that are not displayed on the execution screen of the application is a feature of the present invention. For this, the input-history display control unit of the present invention displays a plurality of continuously keyed-in keys as a key operation history on the input-history display screen.

Furthermore, the input-history display control unit of the present invention displays a key operation history of a hidden key, which is not displayed on the execution screen of the application when keyed in, on the input-history display screen. The hidden key may toe at least any one of a modifier key, a function key, and a lock key.

This allows the key input of even a hidden key, such as a modifier key, a function key, or a lock key, to be visualized, allowing a key input that cannot be grasped from the execution screen of the application to be easily found out.

The present invention includes an input-history storage control unit that generates data in which key operation histories sequentially output by the input-history display control unit and applications are associated with each other and an input-history storage unit that stores the data in which the key operation histories and the applications are associated and which is generated by the input-history storage control unit.

This allows the administrator to monitor tampering of the operator etc., thereby improving the security of information management.

Furthermore, the input-history display control unit of the present invention can stop outputting the key operation histories according Co a predetermined key input operation.

This oars prevent passwords or the like from being found out by a third party, thereby improving the security of information management.

Advantageous Effects of Invention

The present in vent ion allows key inputs to an application performed using an input device, such as a keyboard, to be visualized so that the context can be grasped using the flow of key inputs as a series of key operation histories. This facilitates communicating how to operate the application using efficient and effective key input. This therefore contributes to improvement in work efficiency and productivity by using the application.

DESCRIPTION OF EMBODIMENTS

Embodiments of a key-input display apparatus, a key-input display program, and a method for displaying key inputs of the present invention will be described with reference to the drawings.

Figure 1:
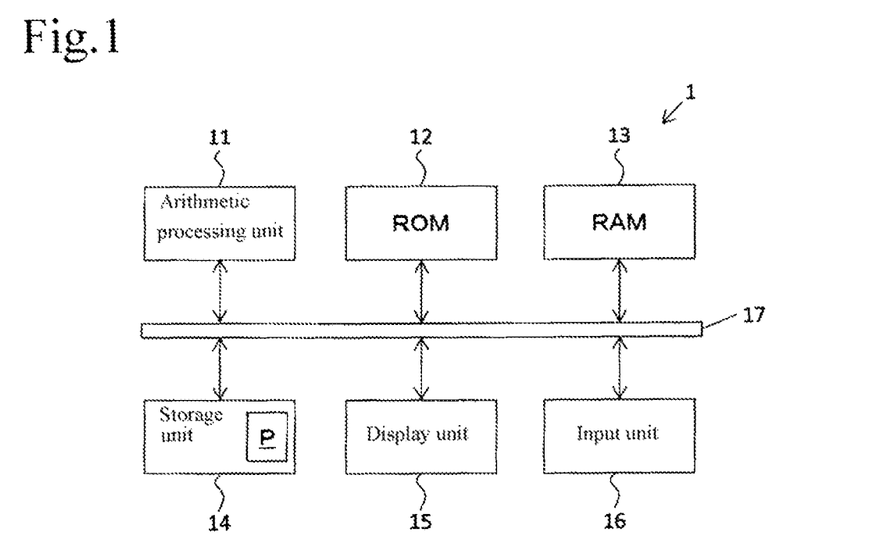
FIG. 1 is an explanatory diagram illustrating the hardware configuration of a key-input display apparatus according to an embodiment.

FIG. 1 is a block diagram illustrating an example of the hardware configuration of a key-input display apparatus 1 according to the present embodiment. The key-input display apparatus 1 includes an arithmetic processing unit 11, a read-only memory (ROM) 12, a random-access memory (RAM) 13, a storage unit 14, a display unit 15, and an input unit 16, which are connected by a bus 17. This is implemented by a computer. Specific examples include a notebook personal computer, a desktop personal computer, and a tablet terminal.

In the computer, the arithmetic processing unit 11 executes an OS and applications executed on the OS to implement their functions. The applications can be any applications, such as word processing software, spreadsheet software, programming software, and CAD software. A key-input display program p runs in the background of those applications. The key-input display apparatus 1, the key-input display program P, and the method for displaying key inputs visualize key inputs to the OS or a running application, which are performed by operating the input unit 16, to enable a method for operating the application using efficient and effective key inputs to foe visually communicated.

The arithmetic processing unit 11 is formed of an arithmetic unit, such as a CPU. The arithmetic processing unit 11 controls the entire operation of the key-input display apparatus 1 by executing the key-input display program P stored in the storage unit 14. Furthermore, the arithmetic processing unit 11 implements function parts (a display control unit 18, an input-data acquisition unit 19, a key-kind determination unit 20, a display setting unit 21, an input-history display control unit 22, a display-setting storage unit 23, a display-data storage unit 24, and an input-history display unit 25), described later, by executing the program.

The ROM 12 is a read-only storage unit and stores a basic input/output system (BIOS) and the like. The RAM 13 is a primary storage and temporarily stores data in a rewritable manner.

The storage unit 14 is constituted of a non-volatile storage device, such as a hard disk drive (HDD) or a semiconductor storage device. The storage unit 14 stores the key-input display program P and also a data table Pd in which operated keys are associated with "key indication" displayed as "key operation history" in the input-history display unit 25, described later.

The display unit 15 is a display, such as a liquid-crystal panel display, and displays various information on its screen on the basis of display signals from the arithmetic processing unit 11.

The input unit 16 includes input devices, such as a keyboard, a touch panel, and a mouse, generates key input data according to an input operation thereon, and outputs the key input data to the arithmetic processing unit 11.

Figure 2:
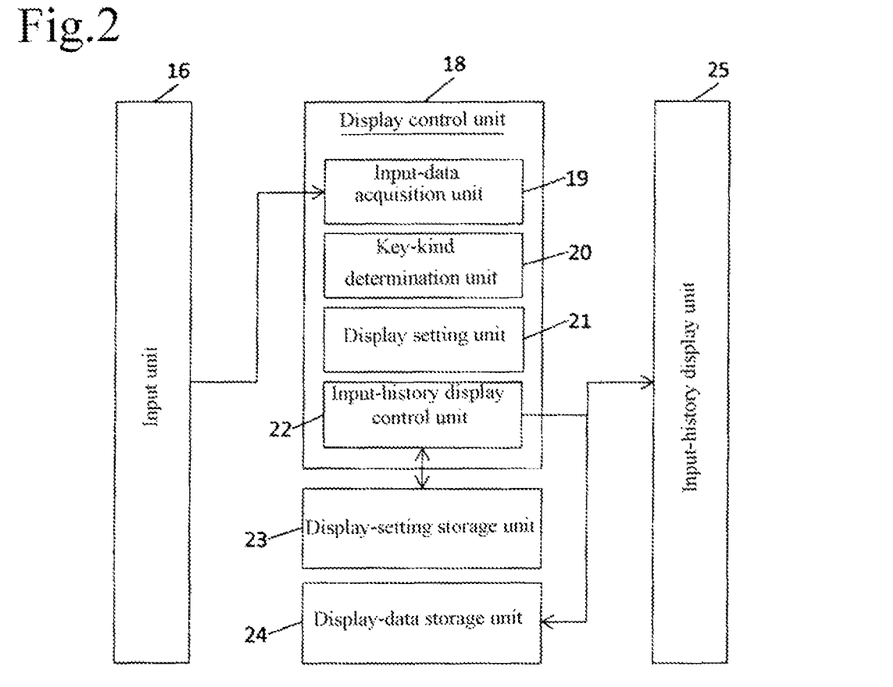
FIG. 2 is a block diagram illustrating the functional configuration of a key-input display apparatus according to an embodiment.

FIG. 2 is a block diagram illustrating the functional configuration of the key-input display apparatus 1 implemented by the arithmetic processing unit 11. The arithmetic processing unit 11 configures the display control unit 18 by executing the key-input display program P stored in the storage unit 14. The display control unit 18 executes the input-data acquisition unit 19, the key-kind determination unit 20, the display setting unit 21, and the input-history display control unit 22 as function parts. The display control unit 18 implements the RAM 13 or the storage unit 14 as the display-setting storage unit 23 and the display-data storage unit 24 and implements the display unit 15 as the input-history display unit 25, which is "input-history display screen".

The display control unit 18 includes the input-data acquisition unit 19, the key-kind determination unit 20, the display setting unit 21, and the input-history display control unit 22 and controls display of data stored in the ROM 12 and the storage unit 14 and various data generated by the arithmetic processing unit 11 on the display unit 15.

The input-data acquisition unit 19 acquires key input data generated according to key input for the OS or various applications to foe executed on the OS. Here, "key input" means an input performed by operating the above-described input unit 16. Therefore, the input unit 16 may not necessarily have a key arrangement, such as a keyboard or a virtual keyboard displayed on a touch panel. This is because there is a need to enable an input operation without key arrangement using a mouse alone or in combination with a keyboard and to visualize key input.

In the present embodiment, the key input also includes an input performed by mouse operation, but it may be limited to keyboard operation, depending on the application in which key input is to be visualized. This is because there is software in which input operation is performed at high speed using a keyboard with almost no mouse, like programming software.

The key-kind determination unit 20 determines the kind of a key with which key input data is generated. For example, with a keyboard, there are keys that can be displayed on the input-history display unit 25 and keys that cannot be displayed thereon. The key-kind determination unit 20 determines to which of the two the key input data acquired by the input-data acquisition unit 19 is applicable.

In the former case, for example, when the key top of English letter "A" is input using word processing software, the English letter "A" is displayed on the execution screen of the word processing software. Therefore, even a person other than the operator can find out the operated key from the execution screen. When the input operation and the screen display of the input result in the application match, "A" is displayed on the input-history display unit 25.

In contrast, even if the key top of a "modifier key" (a shift key, a control key, etc.) is operated in word processing software, nothing is displayed on the execution screen of the word processing software. When such "hidden key" is operated, persons other than the operator cannot find out what key is operated from the execution screen and does not notice that the operation itself. In other words, the input operation and the screen display of the input result do not match. However, experts make a greater use of modifier keys in input operation to make the input operation efficient and effective, so that there are many things to learn from it. For that reason, in the present embodiment, "hidden key", such as a modifier key, is displayed as a key operation history on the input-history display unit 25 in combination with another key which is used in combination therewith. For example, when the key top of English letter "C" is operated after a control key "CTRL" is operated, "CTRL+C" is displayed on the input-history display unit 25.

"Lock key", such as a capital lock key (CAPS), and various kinds of "function key", such as an escape key, a half-width/full-width key, a conversion key, a non-conversion key, function keys, a katakana/hiragana key, and arrow keys, are also included in "hidden key", so that an input operation and the screen display of the input result do not match like the modifier keys. Therefore, when such a function key is operated, a key operation history corresponding to the function key is displayed on the input-history display unit 25. For example, a right arrow key for moving a cursor is operated, "→" is displayed on the input-history display unit 25. The cursor is displayed on the execution screen of the application and is moved and displayed on the execution screen when an arrow key is operated. However, this is so hard to find out that the present embodiment also deals with the arrow keys as "hidden key".

The display setting unit 21 first associates key indication displayed on the input-history display unit 25 with each key input for each application. There are the following three patterns.

First, for hidden keys, such as modifier keys and function keys, the display setting unit 21 waits for the subsequent key input and sets a combination with the key as "single key indication". In one example, the display setting unit 21 detects that "CTRL" is held down and then "C" is operated, and sets "CTRL+C" as "single key indication".

The second is a pattern in which a specific letter string defined in the application is dealt with as "single key indication". For example, in the case of programming software, functions used in C language are defined. For example, displaying the letter string of a function fprintf" one by one for each letter makes it more difficult to understand. In such a case, the letter string; of the function fprintf" is set as "single key indication". Each application is set according to its features.

The third is a pattern in which a single key input is set as "single key indication". For example, when English letter "A" is keyed in, "A" is displayed as it is. For "ENTER" key, the letter string, logo, or symbol of "ENTER" is set as "single key indication".

The display setting unit 21 establishes association of "single key indication" displayed on the input-history display unit 25 according to key input for each application, as in the above. Furthermore, the display setting unit 21 sets a key indication to be displayed per line by the input-history display unit 25. For example, first, the display setting unit 21 can set key indication so as to display only "single key indication" per line. Secondly, the display setting unit 21 can also set the maximum number of "single key indication" displayed in one line for display. Thirdly, the display setting unit 21 can set the number of "single key indication" displayed in one line according to the width of the display screen of the input-history display unit 25. Fourthly, the display setting unit 21 can set an upper limit to the time to stop a key input operation, and when the time exceeds the upper limit, sets the key indication so to be displayed in the next line. Fifthly, the display setting unit 21 can set the key indication in any combination of the first to fourth. However, it is preferable to display about two to four key indications even when a plurality of key indications are displayed, because a too large number of key indications displayed per line makes it difficult to understand fast and complex key input. The setting of key indications to toe displayed per line is performed for each application according to the features and necessity of the application.

The input-history display control unit 22 performs control of the application to which the key-input display program P is applied so as to sequentially output key indications corresponding to key inputs to the input-history display unit 25 with reference to the data table Pd for display settings, described later.

Figure 3:
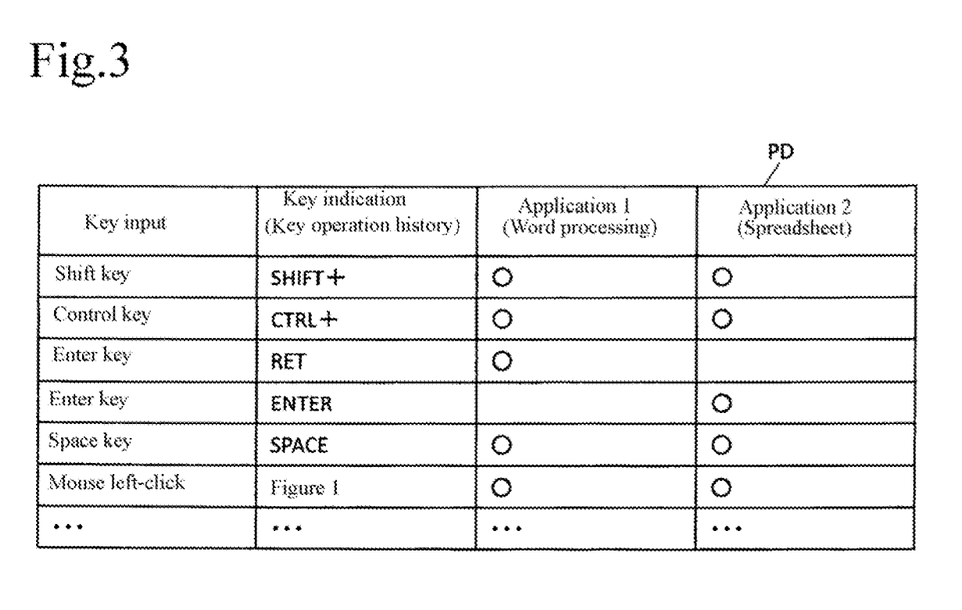
FIG. 3 is an explanatory diagram illustrating a data table according to an embodiment.

The display-setting storage unit 23 stores settings of key indications displayed according to predetermined key input set by the display setting unit 21. The display-setting storage unit 23 stores, for example, the data table Pd shown in FIG. 3. In the data table Pd, "key indication (key operation history)" corresponding to key input and an application to which it is applied are associated with each other. A different key indication can be applied to even the same key input for each application.

The display-data storage unit 24 stores image data to be used as a key indication displayed per key input by the display setting unit 21. The image data may be standard characters, designed or decorated logos, figures, or symbols.

FIG. 4 to FIG. 7 illustrate examples of the display screen of the display unit 15. A desktop screen W1 displays an execution screen W2 of an application for editing text. On the right side thereof, the input-history display unit 25 serving as "input-history display screen" is displayed side by side. The input-history display unit 25 of the present embodiment has a vertically long rectangular shape. The letter string displayed at the lower part inside the input-history display unit 25 is a key indication 25a. In the input-history display unit 25, the key indication 25a is displayed for each line from the bottom to the top of the screen.

The input examples in FIG. 4 to FIG. 7 will be described hereinbelow. In this case, a series of takes of "copying the first line, pasting it on the second line, and editing a part" is performed on the assumption of input during programming.

Figure 4:
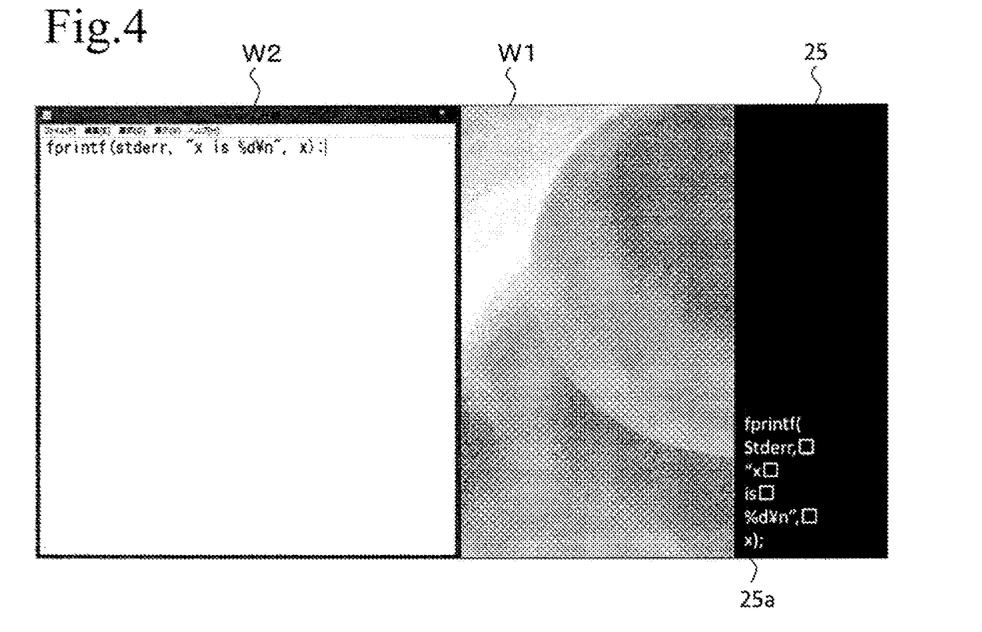
FIG. 4 is an explanatory diagram illustrating an example of the display screen of a key-input display apparatus according to an embodiment.

As shown in FIG. 4, when a letter string "fprintf . . . " is keyed in the application, it is displayed on the execution screen W2, and a key indication "fprintf(" is displayed in the first line of the input-history display unit 25 in conjunction with it. In conjunction with a subsequent key input, a key indication "Stderr, ☐" is displayed in the second line. Note that "☐" is the key indication of a space key. When key input is continued, the illustrated key indications are shown in the third, fourth, fifth, and sixth lines, in the same way as above.

Figure 5:
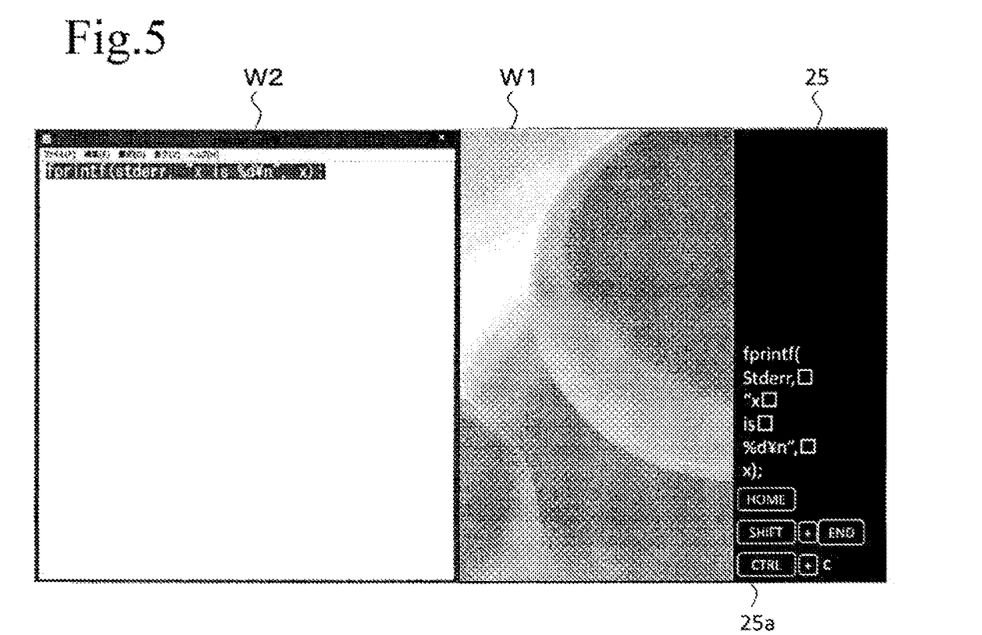
FIG. 5 is an explanatory diagram illustrating an example of the display screen following FIG. 4.

Next, the key input illustrated in FIG. 5 is performed. This is an operation in which the key input is not displayed on the screen. In other words, the line "fprintf( . . . x);" displayed on the execution screen W2 is selected and copied. A change in the execution screen W2 after the copying is performed is only a reversed display upon the selection. However, for the key input, the key indications of "HOME key" (move the cursor to the head of the line), "SHIFT+END" (select the line to the end), and "CTRL+C" (copy) are respectively displayed in the seventh line, the eighth line, and the ninth line, as illustrated in the input-history display unit 25. This shows that such a complex operation has been performed.

Figure 6:
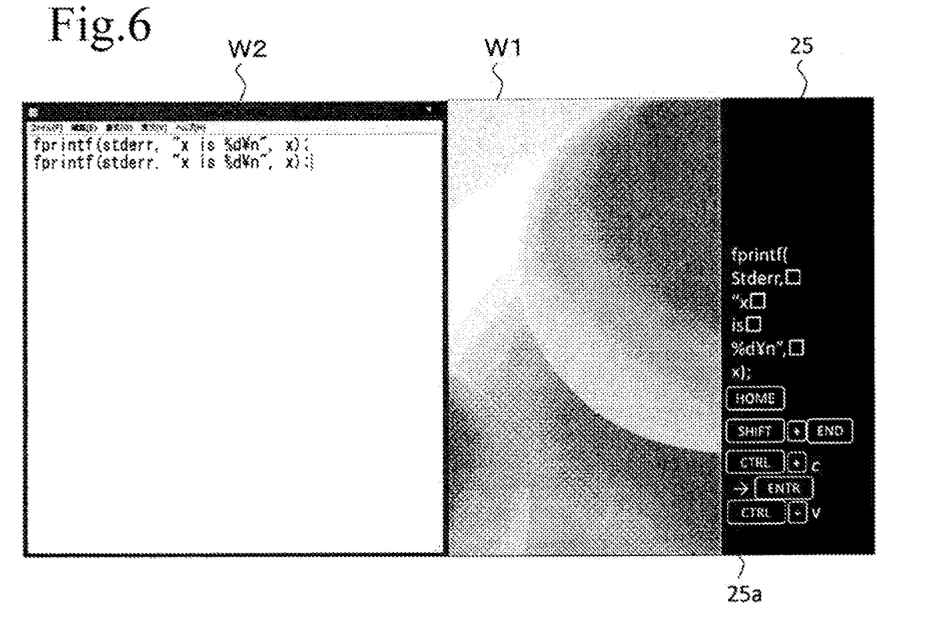
FIG. 6 is an explanatory diagram illustrating FIG. 5.

FIG. 6 subsequent to FIG. 5 is a pasting task. In the execution screen W2, it seems that the same key input as that of the first line is made on the second line. However, with actual key input, the selected state of the letter string in the first line of the execution screen W2 is canceled and the cursor is moved using an arrow key "→" and "ENTER" key is operated for line feed. As illustrated in the 11th line, the key indication "CTRL+V" (paste) is displayed, which shows that multiple key inputs have been performed.

Figure 7:
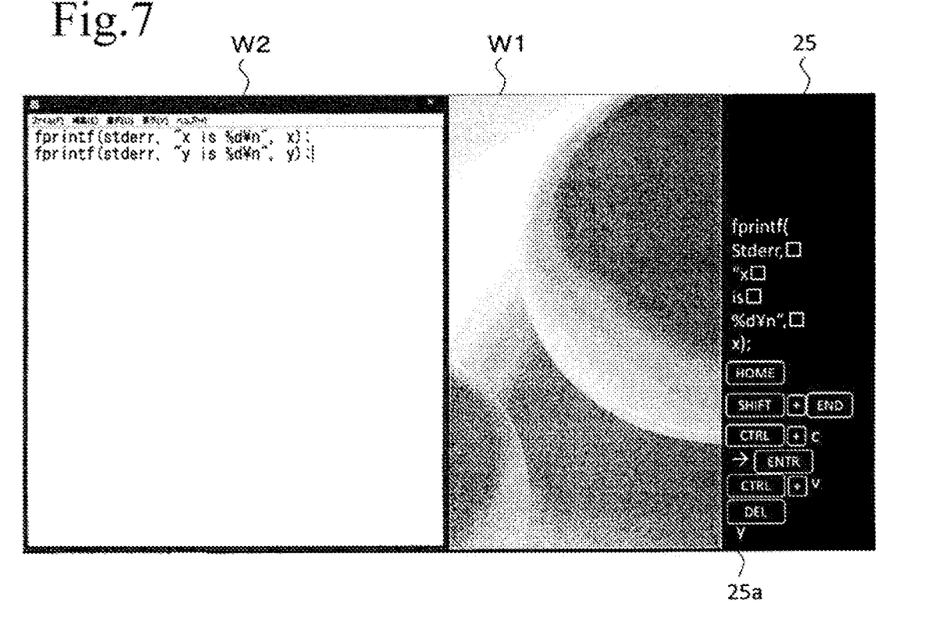
FIG. 7 is an explanatory diagram illustrating an example of the display screen following FIG. 6.

Last, in FIG. 7 subsequent to FIG. 6, a key indication in which the pasted letter "x" of the second line is deleted by keying in the delete key is displayed, as illustrated in the 12th line of the input-history display unit 25. As illustrated in the 13th line, a letter "y" that is newly keyed in is displayed. In that way, the present embodiment visualizes the key operation history of key input by displaying key indications by line feeding.

Figure 8:
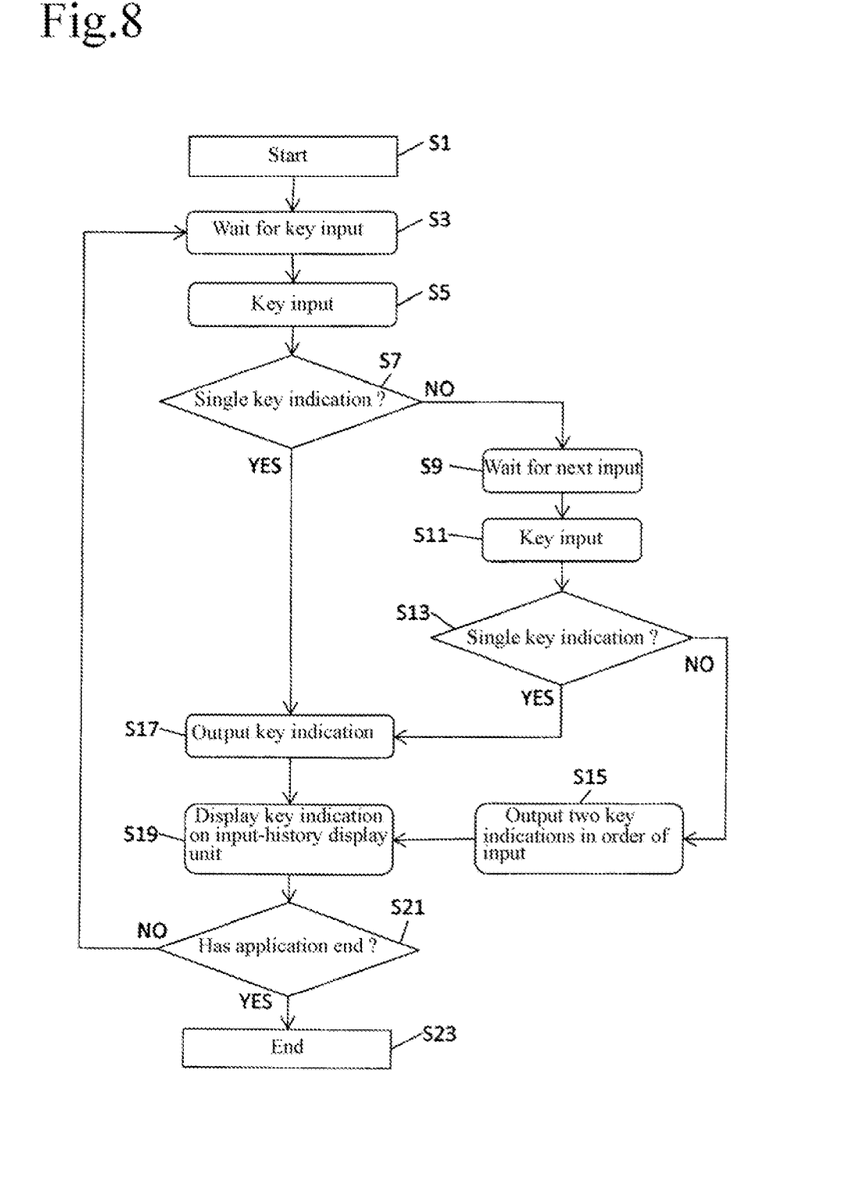
FIG. 8 is a flowchart illustrating an operation according to a key-input display apparatus and a method for displaying key inputs according to an embodiment.

FIG. 8 is an operation flowchart of the key-input display apparatus 1 that executes the key-input display program P.

When the key-input display program P is started (S1), the key-input display apparatus 1 enters a state waiting for a key input for a selected application (S3). Specifically, the key-input display apparatus 1 enters a state waiting for the input-data acquisition unit 19 to acquire key input data generated due to key input to the input unit 15.

When the input-data acquisition unit 19 acquires key input data (S5), the key-kind determination unit 20 determines whether the key input data is a key input corresponding to "single key indication" (S7). For example, when the input-data acquisition unit 19 acquires key input data generated by keying in "CTRL", the key-kind determination unit 20 does not determine that it corresponds to "single key indication" from the key input data alone and enters a state waiting for the next input (S9).

On the other hand, when the input-data acquisition unit 19 acquires key input data generated by keying in English letter "A", the key-kind determination unit 20 determines that it corresponds to "single key indication" from the key input data alone (S7). Then, the input-history display control unit 22 executes a process of outputting key indication "A" corresponding to the key input to the input-history display unit 25 (S17), and the key indication "A" is displayed on the input-history display unit 25 of the display unit 15 displays (S19).

Referring back to step S9, at which the key-kind determination unit 20 enters a state waiting for the next input, and the next key input is performed, the input-data acquisition unit 19 acquires key input data (S11), and the key-kind determination unit 20 determines whether the key input data corresponds to a key input that constitutes "single key indication" in combination with the preceding key input data, as in the above (S13). Since this is a key input immediately after "CTRL", the key-kind determination unit 20 determines whether a key that completes as an input operation in combination with it has been input. For example, when "c" in FIG. 5 or "v" in FIG. 6 is keyed in, the key-kind determination unit 20 determines that "CTRL+ C" or "CTRL+ V" is "single key indication". Then, the input-history display control unit 22 reads key indication "CTRL+C" or "CTRL+V" corresponding thereto from the display-data storage unit 24 and executes a process of outputting the key indication to the inputs-history display unit 25 (S17), and it is displayed as "single key indication" on the input-history display unit 25 in the display unit 15 (S19).

In contrast, if at step 13 it is determined that the next input is a key input that does not complete an input operation by combining with the preceding "CTRL", the input-history display control unit 22 outputs key indications corresponding to those key inputs to the display unit 15 in the order of input (S15), and it is displayed as "single key indication" on the input-history display unit 25 in the display unit 15 (S19).

A series of steps as described above are executed for each key input. When the execution of the key-input display program P ends or when the application ends, the key-input display program P also ends.

According to the key-input display apparatus 1, the key-input display program P, and the method for displaying key inputs, all key inputs performed on the application are displayed on the input-history display unit 25 and visualized. This eliminates the need for alternately following input operations on the input unit 16, such as a keyboard, and the execution screen W2 of the application with eyes and allows the flow of the key inputs to be easily grasped in real time by watching the input-history display unit 25 that is displayed side by side with the execution screen W2. Since the input-history display unit 25 is displayed as a dedicated screen (separate screen) independent from the execution screen W2 of the application, it has high visibility. Furthermore, since the key indications, which are key operation histories displayed on the input-history display unit 25, are displayed while being fed in the order of key inputs, the key input operations can foe grasped as a flow. This enables the context of even a fast and complex key input to be grasped, allowing operator's operations on the application to be effectively and efficiently communicated to learners.

As illustrated in FIG. 4 to FIG. 8, only two to four key indications per line are displayed on the input-history display unit 25 in which key inputs are visualized. Therefore, even when key indications are displayed one by one by line feeding, they can be easily grasped.

Furthermore, in addition to the functions of the key-input display apparatus 1 according to the embodiment described above, the function of storing key operation histories in the RAM 13, the storage unit 14, or an external storage unit may be added so that the administrator can monitor tampering of the operator etc., thereby improving the security of information management.

Figure 9:
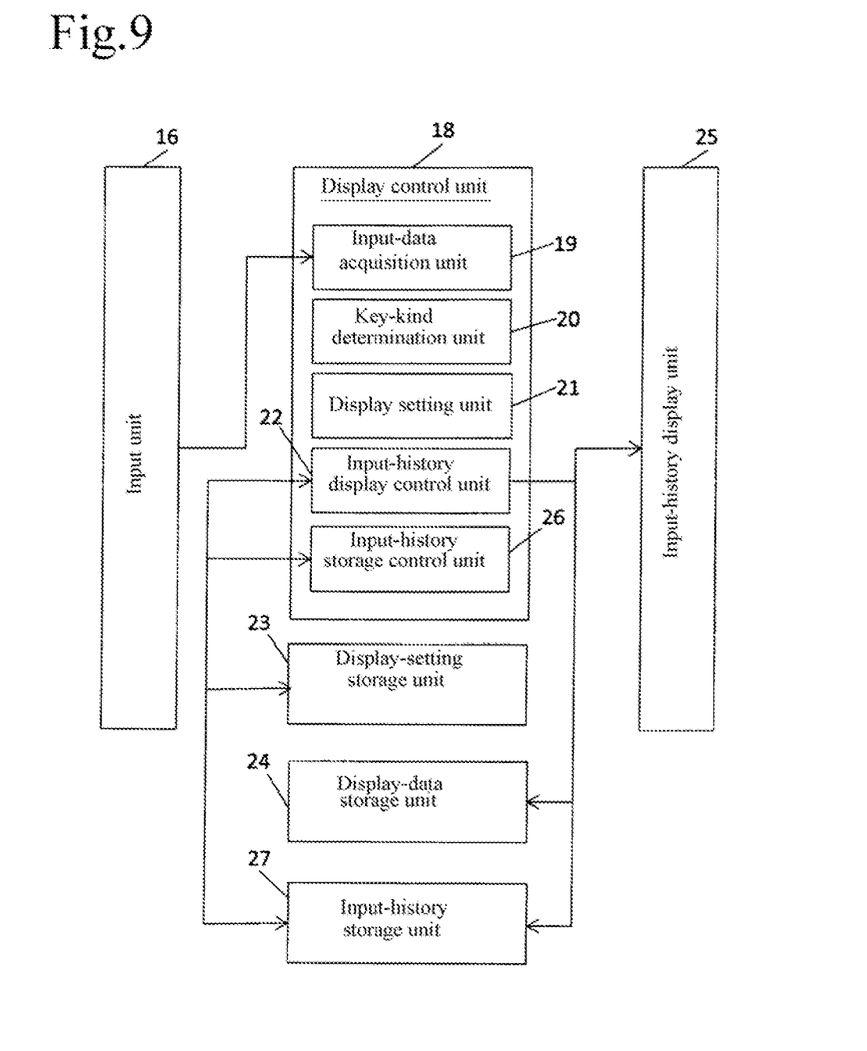
FIG. 9 is a block diagram illustrating the functional configuration of a key-input display apparatus according to a modification.

First, an embodiment in which key operation histories are stored in the RAM 13 or the storage unit 14 will be described. FIG. 9 is a block diagram illustrating the functional configuration of a key-input display apparatus 10 according to a modification. In FIG. 9, the same functional configurations as those of the key-input display apparatus 1 according to the embodiment illustrated in FIG. 1 are given the same signs, and detailed descriptions of the same configurations are omitted, and differences from the key-input display apparatus 1 are mainly described in the following description.

The key-input display apparatus 10 illustrated in FIG. 9 has the same hardware configuration as that of the key-input display apparatus according to the embodiment illustrated in FIG. 1, whereas it differs in functional configuration because key operation histories are stored in the RAM 13 or the storage unit 14.

A display control unit 18 of the key-input display apparatus 10 implements the input-data acquisition unit 19, the key-kind determination unit 20, the display setting unit 21, and the input-history display control unit 22 as function parts, and in addition, implements an input-history storage control unit 26 as a function part.

Furthermore, the display control unit 18 of the key-input display apparatus 10 implements the RAM 13 or the storage unit 14 as the display-setting storage unit 23, the display-data storage unit 24, and an input-history storage unit 27 and implements the display unit 15 as the input-history display unit 25, which is "input-history display screen".

The input-history storage control unit 26 generates data in which a key operation history that is output from the above-described input-history display control unit 22 one after another and the application are associated and outputs the data to the input-history storage unit 27.

In this modification, it is assumed that the output of the data in which a key operation history and the application are associated is sequentially performed each time an input is made. However, the present invention should not be limited to that. The output may be performed at any timing, such as predetermined time intervals or at the end of the application.

The input-history storage unit 27 stores key operation histories output from the input-history storage control unit 26 and the application in association with each other. The data stored in the input-history storage unit 27 can be read by the input-history display control unit 22 and can be displayed on the input-history display unit 25.

The data stored in the input-history storage unit 27 may be output to an external storage unit, another computer, or the like (not shown).

With the key-input display apparatus 10 of the modification, all key inputs performed by the operator are stored in the input-history storage unit 27. This allows an administrator to monitor operations performed by the operator to check whether an improper input or the like has been made, thereby improving the security of information management.

Figure 10:
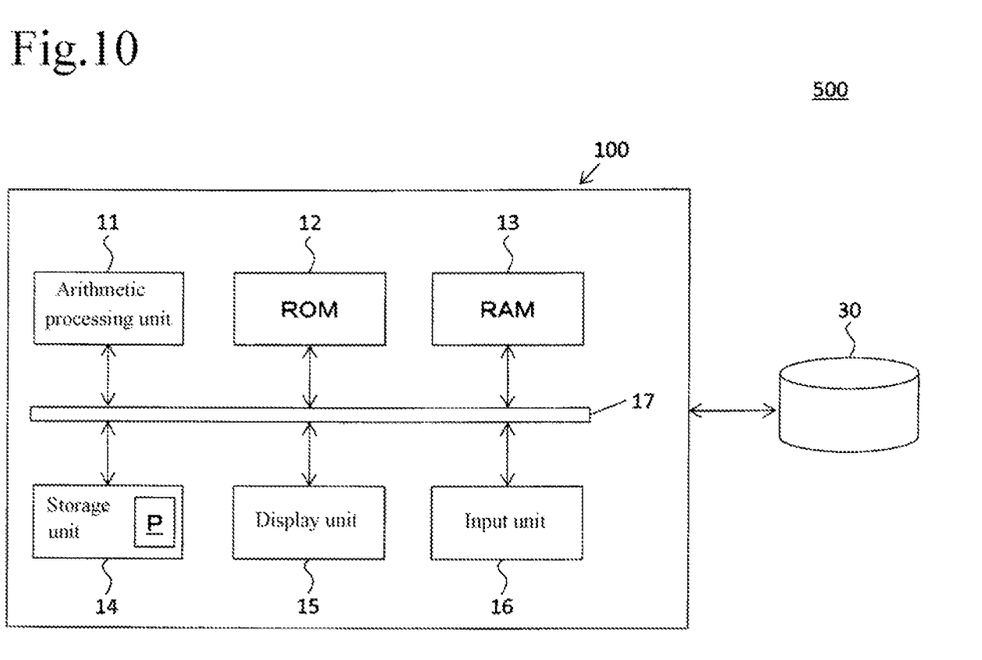
FIG. 10 is a block diagram illustrating an example of the hardware configuration of a key-input display system.

Next, an embodiment in which key operation histories are stored in an external storage unit will be described. FIG. 10 is a block diagram illustrating an example of the hardware configuration of a key-input display system 500. In FIG. 10, the same functional configurations as those of the key-input display apparatuses 1 and 10 according to the embodiment and the modification are given the same signs, and detailed descriptions of the same configurations are omitted, and differences from the key-input display apparatuses 1 and 10 are mainly described in the following description.

The key-input display system 500 includes a key-input display apparatus 100 and an external storage unit 30.

The block diagram of the functional configuration of the key-input display apparatus 100 is the same as that of the key-input display apparatus 10 of the modification illustrated in FIG. 9. However, the input-history storage unit 27 is implemented by the external storage unit 30.

The external storage unit 30 stores key operation histories output from the input-history storage control unit 26 and the application in association with each other. The data stored in the external storage unit 30 can be read and displayed by another computer or the like (not shown). The external storage unit 30 may be implemented as not only a local storage unit but also a storage unit of a server on a network.

In such a key-input display system 500, all key inputs performed by the operator are stored in the external storage unit 30. This also allows the administrator to monitor operations performed by the operator to check whether ah improper input or the like has been made, thereby improving the security of information management.

Furthermore, in the above-described key-input display apparatuses 1, 10, and 100, all key inputs are displayed on the input-history display unit 25 by the input-history display control unit 22. However, the present invention may be configured such that the input-history display control unit 22 has a function of temporarily stepping such displaying according to a predetermined operator's operation.

For example, when operators are required to input individually assigned passwords at the start of the application to manage access to information, it is necessary to prevent the passwords from being found out by a third party other than the operators to which the passwords are assigned.

For that reason, when an operator communicates how to operate the application to a learner under the condition that such passwords are set, the operator performs a predetermined operation so that the input-history display control unit 22 temporarily stops the output of key operation histories. This stops displaying key inputs, thereby preventing passwords from being found out by the learner.

An example of an operation to stop and resume displaying key inputs is inputting an alternate key "Alt" and then entering the key top of English letter "C".

Providing such functions can present passwords or the like from being found out by a third party, thereby improving the security of information management.

Having described embodiments of the present invention, the present invention should not be limited to the above embodiments, and various changes, replacements, and additions can be made without departing from the principles of the present invention.

For example, the key-input display program in the above embodiments can be provided as a computer-readable storage medium. The storage medium may have any storage format as long as it is a computer-readable storage medium that can store programs, such as a magnetic disk, an optical disk (CD-ROM, CD-R, DVD, etc.), a magnetooptical disk (MO, etc.) or a semiconductor memory.

The key-input display program P of the above embodiments may be stored on a computer connected to a network, such as the Internet, and can be provided by being downloaded via the network.

The key-input display apparatuses 1, 10, and 100, the key-input display program P, and the method for displaying key inputs according to the present invention can be used not only in personal computers and tablet terminals, described at the beginning of the present embodiment, but also smartphones, game machines, and industrial equipment. This is because they can also display key operation histories generated by Key inputs on their display units.

In the above embodiments, the input-history display control unit 22 performs control for sequentially outputting key indications to the input-history display unit 25 arranged on a separate screen from the execution screen of the application, whereas the present invention may have a form in which the input-history display unit 25 is in transparent color and is displayed on top of the execution screen of the application. This form allows the execution screen of the application to be transparently displayed from below the input-history display unit 25, thereby preventing part of the execution screen of the application from becoming invisible due to a display on the input-history display unit 25.

REFERENCE SIGNS LIST 1, 10, 100 Key-Input Display Apparatus
11 Arithmetic Processing Unit
12 ROM
13 RAM
14 Storage Unit
15 Display Unit
16 Input Unit
17 Bus
18 Display Control Unit
19 Input-Data Acquisition Unit
20 Key-Kind Determination Unit
21 Display Setting Unit
22 Input-History Display Control Unit
23 Display-Setting Storage Unit
24 Display-Data Storage Unit
25 Input-History Display Unit (Input-History Display Screen)
26 Input-History Storage Control Unit
27 Input-History Storage Unit
30 External Storage Unit
500 Key-Input Display System
P Key-Input Display Program
Pd Data Table

The invention claimed is:

1. A key-input display apparatus that displays a key indication corresponding to a key input to a plurality of first applications operated by key input on an execution screen of the plurality of first applications displayed on a display unit and an input-history display screen displayed by a key-input display program which is running in a second application independent from the plurality of first applications, the key-input display program running in the background of the plurality of first applications, the apparatus comprising:

an input-data acquisition unit that acquires key input data generated by key input on the plurality of first applications;

a key-kind determination unit that determines whether the key input data is generated by a key input to a key displayable on the execution screen or by a key input to a hidden key that is not displayable on the execution screen;

a display setting unit that sets, for the hidden key, a key indication to be displayed on the input-history display screen; and an input-history display control unit that outputs the input-history display screen in which the key indications are sequentially displayed as a key operation history to the display unit, the key operation history includes the key indication of the key that can be displayed on the execution screen of the plurality of first applications and the key indication of the hidden key;

wherein the input-history display screen is not the execution screen of the plurality of first applications but a display screen of the key-input display program displayed as a separate screen independent from the execution screen of the plurality of first applications;

wherein the display setting unit is configured to be able to set the key indication of the hidden key for each of the plurality of first applications;

wherein the input-history display control unit is configured to be able to display the key indications of the plurality of first applications on the input-history display screen in the order in which they are input.

2. The key-input display apparatus according to claim 1, wherein the input-history display control unit displays a key operation history of each key input line by line on the input-history display screen.

3. The key-input display apparatus according to claim 1, wherein the input-history display control unit outputs a previously selected key operation history of the plurality of first applications to the input-history display screen and then outputs a subsequently selected key operation history of the plurality of first applications selected while feeding the histories in one direction.

4. The key-input display apparatus according to claim 1, wherein the input-history display control unit displays a single keyed-in key as a key operation history on the input-history display screen.

5. The key-input display apparatus according to claim 1, wherein the input-history display control unit displays a plurality of keys that are continuously keyed in as a key operation history on the input-history display screen.

6. The key-input display apparatus according to claim 1, wherein the input-history display control unit displays a key operation history of a hidden key on the input-history display screen, the hidden key being not displayed on the execution screen of the plurality of first applications when keyed in.

7. The key-input display apparatus according to claim 6, wherein the hidden key is at least one of a modifier key, a function key, and a lock key.

8. The key-input display apparatus according to claim 1, wherein the display setting unit sets an upper limit to a time to stop a key input operation, and wherein, when the key input exceeds the upper limit, a key indication generated by the key input is displayed in one line.

9. The key-input display apparatus according to claim 1, further comprising:
an input-history storage control unit that generates data in which the key operation histories sequentially output by the input-history display control unit and the plurality of first applications are associated with each other; and
an input-history storage unit that stores the data in which the key operation histories and the plurality of first applications are associated, the data being generated by the input-history storage control unit.

10. The key-input display apparatus according to claim 1, wherein the input-history display control unit stops outputting the key operation histories according to a predetermined key input operation.

11. A key-input display system comprising a key-input display apparatus and an external storage unit, wherein the key-input display apparatus is a key-input display apparatus that displays a key indication corresponding to a key input to a plurality of first applications operated by key input on an execution screen of the plurality of first applications displayed on a display unit and an input-history display screen displayed by a key-input display program which is running in a second application independent from the plurality of first applications, the key-input display program running in the background of the plurality of applications, the apparatus comprising:
an input-data acquisition unit that acquires key input data generated by key input on the plurality of first applications;
a key-kind determination unit that determines whether the key input data is generated by a key input to a key displayable on the execution screen or by a key input to a hidden key that is not displayable on the execution screen;
a display setting unit that sets, for the hidden key, a key indication to be displayed on the input-history display screen;
an input-history display control unit that outputs the input-history display screen in which the key indications are sequentially displayed as a key operation history to the display unit, the key operation history includes the key indication of the key that can be displayed on the execution screen of the plurality of first applications and the key indication of the hidden key; and
an input-history storage control unit that generates data in which the key operation histories sequentially output by the input-history display control unit and the plurality of first applications are associated with each other;
wherein the external storage unit stores the data in which the key operation histories and the plurality of first applications are associated with each other;
wherein the input-history display screen is not the execution screen of the plurality of first applications but a display screen of the key-input display program displayed as a separate screen independent from the execution screen of the plurality of first applications,
wherein the display setting unit is configured to be able to set the key indication of the hidden key for each of the plurality of first applications,
wherein the input-history display control unit is configured to be able to display the key indications of a plurality of first applications on the input-history display screen in the order in which they are input.

12. The key-input display system according to claim 11, wherein the input-history display control unit stops outputting the key operation histories according to a predetermined key input operation.

13. A non-transitory computer-readable storage medium that stores a key-input display program that comprises instructions which, when executed by a computer, causes the computer to function as a key-input display apparatus that generates an input-history display screen different from an execution screen of a plurality of first applications operated by key input, and displays a key indication corresponding to a key input to the plurality of first applications, and runs in a second application independent from the plurality of first applications, the program causing the computer to function as:
an input-data acquisition unit that acquires key input data generated by key input on the plurality of first applications;
a key-kind determination unit that determines whether the key input data is generated by a key input to a key displayable on the execution screen or by a key input to a hidden key that is not displayable on the execution screen;
a display setting unit that sets, for the hidden key, a key indication to be displayed on the input-history display screen; and
an input-history display control unit that outputs the input-history display screen in which the key indications are sequentially displayed as a key operation history to the display unit, the key operation history includes the key indication of the key that can be displayed on the execution screen of the plurality of first applications and the key indication of the hidden key;

wherein the input-history display screen is not the execution screen of the plurality of first applications but a display screen of the key-input display program displayed as a separate screen independent from the execution screen of the plurality of first applications, wherein the display setting unit is configured to be able to set the key indication of the hidden key for each of the plurality of first applications, wherein the input-history display control unit is configured to be able to display the key indications of the plurality of first applications on the input-history display screen in the order in which they are input.

* * * * *